(12) United States Patent
Perlman

(10) Patent No.: US 6,684,025 B1
(45) Date of Patent: Jan. 27, 2004

(54) STRUCTURE AND METHOD FOR MANAGING A VIDEO RECORDER

(75) Inventor: Stephen G. Perlman, Palo Alto, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

(21) Appl. No.: 09/333,839

(22) Filed: Jun. 15, 1999

(51) Int. Cl.[7] .................................................. H04N 5/91
(52) U.S. Cl. .......................................... 386/83; 386/46
(58) Field of Search ................................ 386/1, 46, 83, 386/52; 348/474, 705–706, 460, 552, 570, 906; 725/27, 133, 141, 152

(56) References Cited

U.S. PATENT DOCUMENTS

| | | | | |
|---|---|---|---|---|
| 4,677,484 A | * | 6/1987 | Pitsch et al. ................ 348/570 |
| 5,488,409 A | * | 1/1996 | Yuen et al. ................... 386/83 |
| 5,815,631 A | * | 9/1998 | Sugiyama et al. ............ 386/46 |

* cited by examiner

Primary Examiner—Thai Tran
Assistant Examiner—Christopher Onuaku
(74) Attorney, Agent, or Firm—Workman Nydegger

(57) ABSTRACT

A video system receives an instruction to perform a function such as a display or record operation. Computer-executable instructions are for determining the status of a toggle setting (e.g., ON/OFF or TV/VIDEO status) of a video recorder (e.g., a VCR), and for ascertaining whether the toggle setting of the video recorder needs to be toggled to perform the function. The instructions are also for transmitting a toggle instruction to the video recorder if needed to perform, for example, the display or record operation. Thus, the setting of the video recorder automatically occurs without requiring complex user interaction.

22 Claims, 13 Drawing Sheets

STRUCTURE AND METHOD FOR MANAGING A VIDEO RECORDER

BACKGROUND OF THE INVENTION

1. The Field of the Invention

The present invention relates to video signal processing. Specifically, the present invention relates to a structure and method for managing a video recorder.

2. The Prior State of the Art

There is often a video cassette recorder (VCR) connected between an antenna or cable system and a television set (TV). Video will only be clearly displayed on the TV through the VCR if the VCR settings (e.g., ON/OFF setting, TV/VIDEO setting, and VCR tuner channel) are correctly set. Often, manually setting the VCR can be time-consuming or confusing for the user. This confusion is compounded when a cable box is also connected between the cable system and the VCR.

Even if the user is skilled at setting VCRs and cable boxes, a television program is often timer-recorded when the user is not able to check the settings of the VCR and cable box. For example, a user might set the VCR to record a television program during the night or while the user is out of the house. In these situations, even though a user properly sets the VCR and cable box for a timer-record operation, the settings might change unexpectedly before recording. Power interruptions or human tampering, for example, might cause the setting changes.

Therefore, an apparatus and method are desired for managing a video recorder such that a clear video signal is displayed or recorded as desired.

SUMMARY OF THE INVENTION

In accordance with the invention, a computer-readable medium has computer-executable instructions for receiving an instruction to perform a function by a video system. For example, a WebTV™ set top box may receive a user-entered instruction to perform the function of recording or displaying a television program. The user may issue this instruction by means of a remote control using an infrared transmitter.

The instructions also determine the status of a toggle setting of a video recorder (e.g., a video cassette recorder) within the video system. The instructions are further for ascertaining whether the toggle setting of the video recorder needs to be toggled for the video system to perform the function. For example, if the user-entered instruction is for displaying a television program, the video recorder may need to be on. If the video recorder is off, then the ON/OFF setting of video recorder needs to be toggled.

The instructions are for transmitting a toggle instruction to the video recorder if the toggle setting of the video recorder needs to be toggled to perform the function. If the video recorder is off but needs to be on to perform a display operation, a toggle instruction is sent to the video recorder to turn the video recorder on. For example, a WebTV™ set top box may transmit an infrared signal representing an ON/OFF toggle instruction to a VCR.

Also in accordance with the invention, the video system is capable of determining the status of a toggle setting of a video recorder. The video system can also be capable of transmitting to the video recorder toggle instructions corresponding to the video recorder settings that need to be toggled for the video system to perform the function.

Thus, the status of the toggle settings of a video recorder is determined and toggled as needed to perform a predetermined function such as recording or displaying a television program. Thus, the video recorder is automatically set up to perform the function without requiring often frustrating and confusing manipulations of the video recorder by the user. Furthermore, if the user enters a timer-record request, the desired television program is still recorded despite intervening power interruptions or human tampering.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for managing a video recorder.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
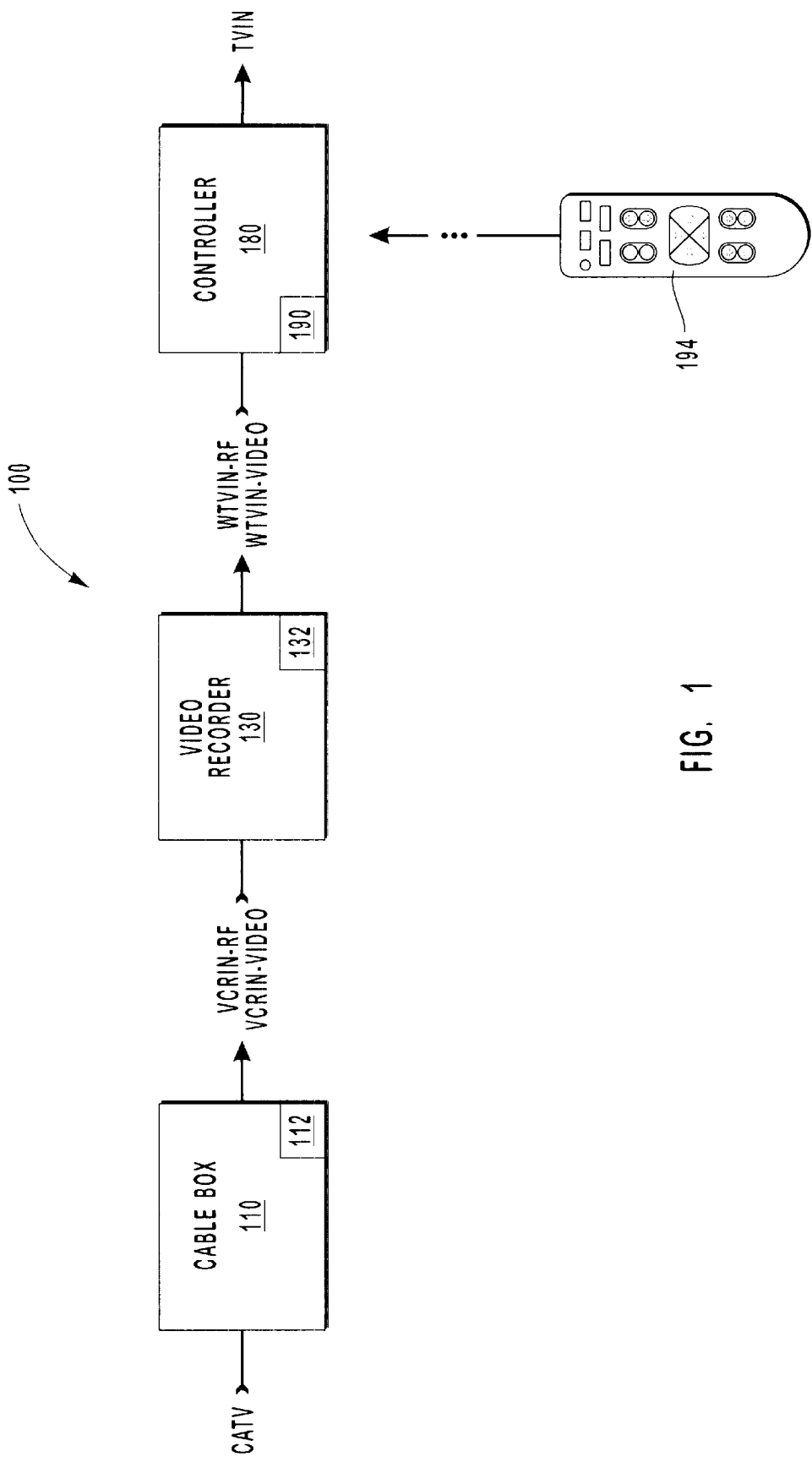
FIG. 1 illustrates a video system according to the present invention.

FIG. 1 shows a video system 100 including a cable box 110. Cable box 110 receives a multi-channel input video signal CATV and outputs signal VCRIN in an RF format (VCRIN-RF) or a VIDEO format (VCRIN-VIDEO). A video recorder 130 such as a video cassette recorder (VCR) receives the signal VCRIN and outputs signal WTVIN in an RF format (WTVIN-RF) or in a VIDEO format (WTVIN-VIDEO). A controller 180 receives signal WTVIN and outputs signal TVIN to a display device such as a television set (not shown). The controller 180 may be incorporated into a WebTV™ set top box, available from WebTV Networks, Inc. of Mountain View Calif., or may be any other suitable electronics device adapted to perform the functions described herein.

A user issues an instruction to an infrared transmitter/receiver 190 of the controller 180 by means of the remote control 194. For example, a user may issue instructions for a display, instant-record, or timer-record operation. In accordance with this instruction, the controller 180 controls the cable box 110 and video recorder 130 by emitting infrared instructions from the infrared transmitter/receiver 190 to respective infrared receivers 112, 132. Techniques for relaying signals or instructions from a remote control device to a set top box, and to other consumer electronics devices, such as cable boxes and video recorders are disclosed in co-pending U.S. patent application Ser. No. 09/154,609, filed Sep. 16, 1998, which is incorporated herein by reference in its entirety.

Of course, the cable box 110 and video recorder 130 have various settings that need to be properly set to perform the desired function. Some of these settings (e.g., record/play or channel tune) can be set by simply issuing an instruction to the cable box 110 or video recorder 130. However, other settings are toggle settings. The status of a toggle setting in response to a toggle instruction depends on the status of the toggle setting before the instruction is implemented. Moreover, the information included in a toggle instruction does not represent the state in which the cable box 110 or video recorder 130 will be after the toggle operation is executed, but merely represents the toggle operation itself. For example, many video recorders have a power button. Pressing the power button turns the video recorder off if the video recorder was on, or turns the video recorder on if the video recorder was off. Typical toggle settings in a video recorder are the ON/OFF and TV/VIDEO settings. A typical toggle setting in a cable box is the ON/OFF setting.

The video system 100 includes a means for determining a status of toggle settings of the video recorder 130. For example, controller 180 automatically determines the ON/OFF setting of the video recorder 130. If needed to perform the desired operation, the ON/OFF setting of the cable box 110 and TV/VIDEO setting of the video recorder 130 are also determined. The video system 100 also includes a means for transmitting toggle instructions to the video recorder 130. The transmitted toggle instructions correspond to the video recorder settings that need to be toggled for the video system to perform the predetermined function. These means are described with respect to each configuration of video system 100.

Several different configurations of the video system 100 are possible as shown in FIGS. 2A, 3A, 4A, 5A, 6A and 7A. Corresponding flow charts showing steps for determining at least one toggle setting of the video recorder 130 are shown in FIGS. 2B, 3B, 4B, 5B, 6B and 7B.

Figure 2A:
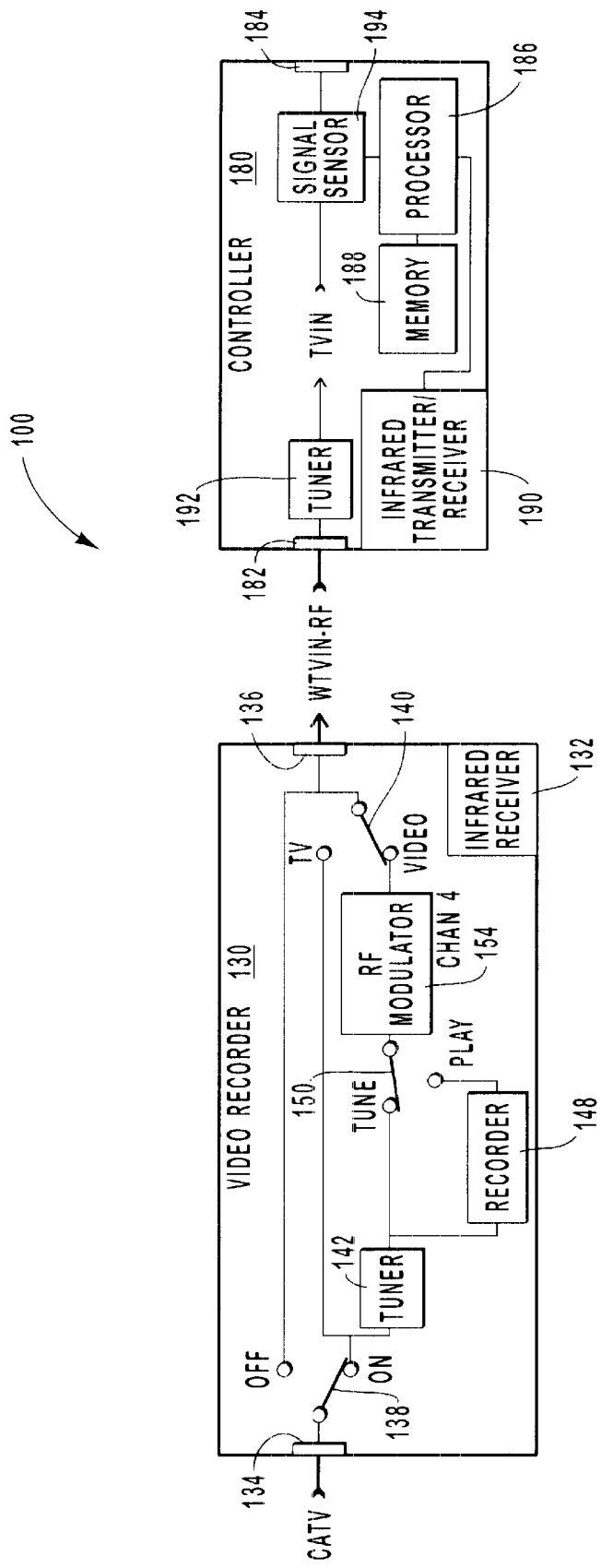
FIG. 2A is a schematic diagram of a configuration of a video recorder and a controller that process analog video signals modulated on a radio frequency carrier wave.

FIG. 2A illustrates a first configuration of the video system 100 in which the video recorder 130 is coupled directly to the input signal CATV without the cable box 110. The video recorder 130 outputs an analog signal modulated on a radio frequency carrier wave (WTVIN-RF). Controller 180 receives signal WTVIN-RF.

Specifically, the video recorder 130 has a video recorder power switch 138 which, when turned to OFF, couples the input signal CATV substantially unaltered through its input terminal 134 directly to its output terminal 136. When the video recorder power switch 138 is turned to ON and a TV/VIDEO switch 140 is turned to TV, the video recorder input signal CATV is likewise coupled substantially unaltered to the output terminal 136 through both switches 138 and 140.

When the video recorder power switch 138 is turned to ON, a video recorder tuner 142 receives the signal CATV, tunes to a channel of signal CATV, and provides the tuned video signal to a recorder 148 and a play switch 150. If the play switch 150 is turned to PLAY, a recorded signal may be provided to a video recorder RF modulator 154. Otherwise, if play switch 150 is turned to TUNE, the RF modulator 154 receives the signal tuned by the video recorder tuner 142. The RF modulator 154 modulates the signal onto a predetermined channel (e.g., channel 4), and provides the modulated signal to the TV/VIDEO switch 140. Note that the video recorder RF modulator 154 provides a strong channel 4 signal even if the signal to the video recorder RF modulator 154 is weak or non-existent.

The controller 180 receives the video recorder output signal WTVIN-RF at its input terminal 182. A controller tuner 192 tunes to one of the channels of the signal WTVIN-RF and provides the tuned signal TVIN to a signal sensor 194. The signal sensor 194 detects the strength of signal TVIN and provides data representing that strength to a processor 186. The processor 186 is configured to execute instructions (e.g., from memory 188) for performing the method of FIG. 2B. Toggle settings needed to properly record or display video data in the configuration of FIG. 2A are the ON/OFF and TV/VIDEO settings of the video recorder 130.

Steps and means for determining a status of a toggle setting of the video recorder 130 (i.e., the ON/OFF and TV/VIDEO settings) are described with reference to FIG. 2B. First, the controller tuner 192 is tuned to a good channel (e.g., channel 14) other than the video recorder RF modulator 154 output channel (e.g., channel 4) (step 205 of FIG. 2B). Herein, a "good channel" means any channel in the input signal CATV that has a strong signal, "strong" meaning above a predetermined threshold strength. To facilitate this description, channels 7, 14 and 21 are assumed to be good channels. However, good channels (and bad channels) will differ according to the video source.

Initially, there are four possible scenarios for video recorder ON/OFF and TV/VIDEO settings as shown in Table 1.

TABLE 1

| Scenario | Video Recorder 130 ON/OFF Setting | Video Recorder 130 TV/VIDEO Setting |
| --- | --- | --- |
| 0 | OFF | VIDEO |
| 1 | OFF | TV |
| 2 | ON | VIDEO |
| 3 | ON | TV |

The controller tuner 192 output signal TVIN is monitored for signal strength (step 210). If the signal TVIN is weak, the controller 180 input signal WTVIN-RF has a weak channel 14 signal since the controller tuner 192 is tuned to channel 14. Thus, the video recorder RF modulator 154 likely generated signal WTVIN-RF since channel 14 is a good channel in the input signal CATV. This weak signal would occur if the video recorder power switch 138 is turned to ON and the TV/VIDEO switch 140 is turned to VIDEO (scenario 2 of Table 1). In the other scenarios 0, 1 and 3 of Table 1, the input signal CATV, along with its good channel 14, is provided substantially unaltered by the video recorder 130.

A weak channel 14 signal in step 210 may also be generated if wires are accidentally disconnected or if the video recorder 130 is out of range of the controller 180. To confirm that the reason for the weak channel 14 signal TVIN is that the video recorder 130 is on and set to VIDEO rather than some other cause, the controller 180 performs steps 215, 220, 225 and 230. Specifically, the video recorder tuner 142 is tuned to a known good channel such as channel 14 and the controller tuner 192 is tuned to the output channel of the video recorder RF modulator 154 such as channel 4 (step 215). Next, signal TVIN is again monitored for signal strength (step 220). If the signal TVIN is strong, then the video recorder 130 is properly set up and the processor 186 determines that the strong signal level means that the video recorder 130 is on and set to VIDEO (step 225). If the signal TVIN is weak in step 220, the processor 186 detects an error (step 230).

Returning to step 210, if the signal TVIN is strong in step 210, then channel 14 is strong in signal WTVIN-RF (recall that the controller tuner 192 is tuned to channel 14 in step 210) as when signal CATV is provided substantially unaltered along with the good channel 14 to the controller 180. This would occur in the three Table 1 scenarios shown in Table 2.

TABLE 2

| Scenario | Video Recorder 130 ON/OFF Setting | Video Recorder 130 TV/VIDEO Setting |
| --- | --- | --- |
| 0 | OFF | VIDEO |
| 1 | OFF | TV |
| 3 | ON | TV |

If signal TVIN is strong in step 210, the controller 180 issues a TV/VIDEO toggle instruction to the video recorder 130 (step 235) such that the three scenarios of Table 2 are altered as in Table 3.

TABLE 3

| Scenario | Video Recorder 130 ON/OFF Setting | Video Recorder 130 TV/VIDEO Setting |
| --- | --- | --- |
| 0' | OFF | VIDEO |
| 1' | OFF | TV |
| 3' | ON | VIDEO |

Note that the TV/VIDEO setting of only scenario 3 was toggled since the video recorder 130 is off in scenarios 0 and 1 leaving the toggle instruction ignored. Throughout this description, a prime marker (') is placed after a scenario number to indicate the scenario setting after a toggle instruction regardless of whether that instruction was followed or ignored. Multiple prime markers (") mean that the scenario setting was subject to multiple toggle instructions (either ignored or followed).

The TVIN signal strength is again monitored (step 240). A weak signal TVIN is detected in scenario 3' of Table 3 since the signal WTVIN-RF is modulated on a different channel (i.e., channel 4) than the controller tuner 194 is tuned to (i.e., channel 14). Steps 215, 220, 225, and 230 are repeated as described above if scenario 3' is true. If signal TVIN is strong in step 240, signal WTVIN-RF has a strong channel 14 which would occur if the signal CATV is provided unaltered through the video recorder 130 as when the video recorder 130 is off in scenarios 0' and 1'. A video recorder ON/OFF toggle instruction is then sent to the video recorder 130 (step 245) altering scenarios 0' and 1' as shown in Table 4.

TABLE 4

| Scenario | Video Recorder 130 ON/OFF Setting | Video Recorder 130 TV/VIDEO Setting |
| --- | --- | --- |
| 0" | ON | VIDEO |
| 1" | ON | TV |

Figure 3A:
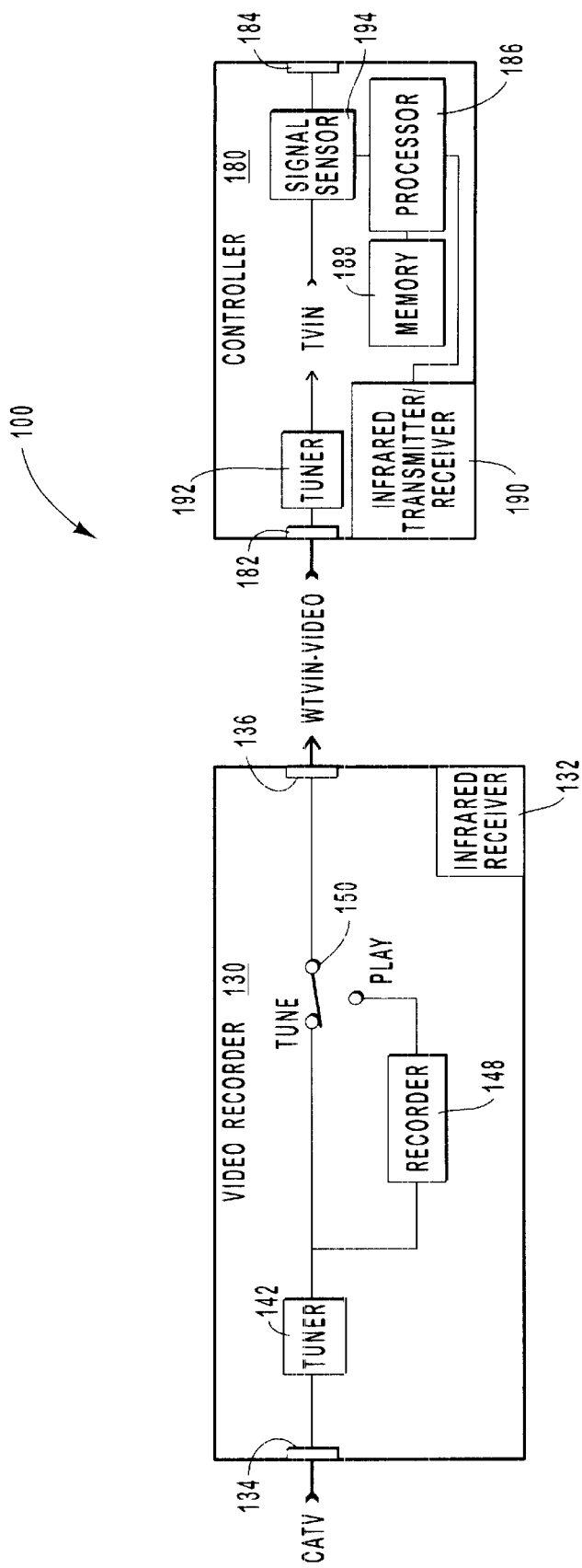
FIG. 3A is a schematic diagram of a second configuration of a video recorder and a controller in which the video recorder outputs an analog video signal.

Next, the strength of signal TVIN is again monitored (step 250). If signal TVIN is weak, then scenario 0" might be true and steps 215, 220, 225 and 230 are repeated to confirm that the video recorder 130 is on and set to VIDEO. Otherwise, the video recorder 130 is determined to be on and set to TV (step 255) as in scenario 1" of Table 4. In this manner, the video recorder 130 ON/OFF and TV/VIDEO settings are determined. FIG. 3A illustrates another configuration of the video system 100 again with only the video recorder 130 and the controller 180. In contrast to FIG. 2A, however, the video recorder 130 outputs a VIDEO signal WTVIN-VIDEO instead of the RF signal WTVIN-RF. If the video recorder 130 is off, the video recorder tuner 142 does not generate any VIDEO signal. If the video recorder 130 is on, the video recorder tuner 142 generates a VIDEO signal WTVIN-VIDEO representing the tuned channel of the input signal CATV. One toggle setting needed to properly record or display video data in the configuration of FIG. 3A is the ON/OFF setting of the video recorder 130.

Steps and means for determining a status of the toggle setting (e.g., ON/OFF status) of the video recorder 130 is described with reference to FIG. 3B. First, the controller 180 determines whether there is any VIDEO signal in signal TVIN (step 305 of FIG. 3B). Specifically, signal sensor 194 monitors signal TVIN for a VIDEO signal strength. If there is no VIDEO signal strength, the controller 180 determines that the video recorder 130 is off (step 310).

Otherwise, the processor 186 notes the sync position of the signal TVIN (step 315). The sync position is a measurement of the relative timing of different signals. Sync positions are almost always different in different channels since each originates at an independent source. A change in the sync position indicates that the channel has changed to another known good channel. The video recorder tuner 142 is changed sequentially to three known good channels such as channels 7, 14 and 21 (step 320). Next, the processor 186 determines if the sync position has changed (step 325). If so, then the video recorder 130 is determined to be on (step 330). If not, the video recorder 130 is determined to be off (step 335). While three known good channels in step 320 is preferred, the video recorder tuner 142 can be tuned to two, three, or more known good channels. It is noted, however, that sequentially tuning the video recorder tuner 142 to more than two known good channels significantly decreases the risk of obtaining a false negative result in steps 325 and 335 compared to tuning to only two known good channels in step 320.

Note that some video recorders 130 output a VIDEO signal even if the video recorder 130 is off. Thus, these video recorders 130 will not be determined to be off in step 310. Instead, the off status is tested in steps 315, 320, and 325. If the sync position hasn't changed after changing channels to three known good channels, then there are no channels in the VIDEO signal and the video recorder 130 is off even though it provides a VIDEO signal.

Figure 4A:
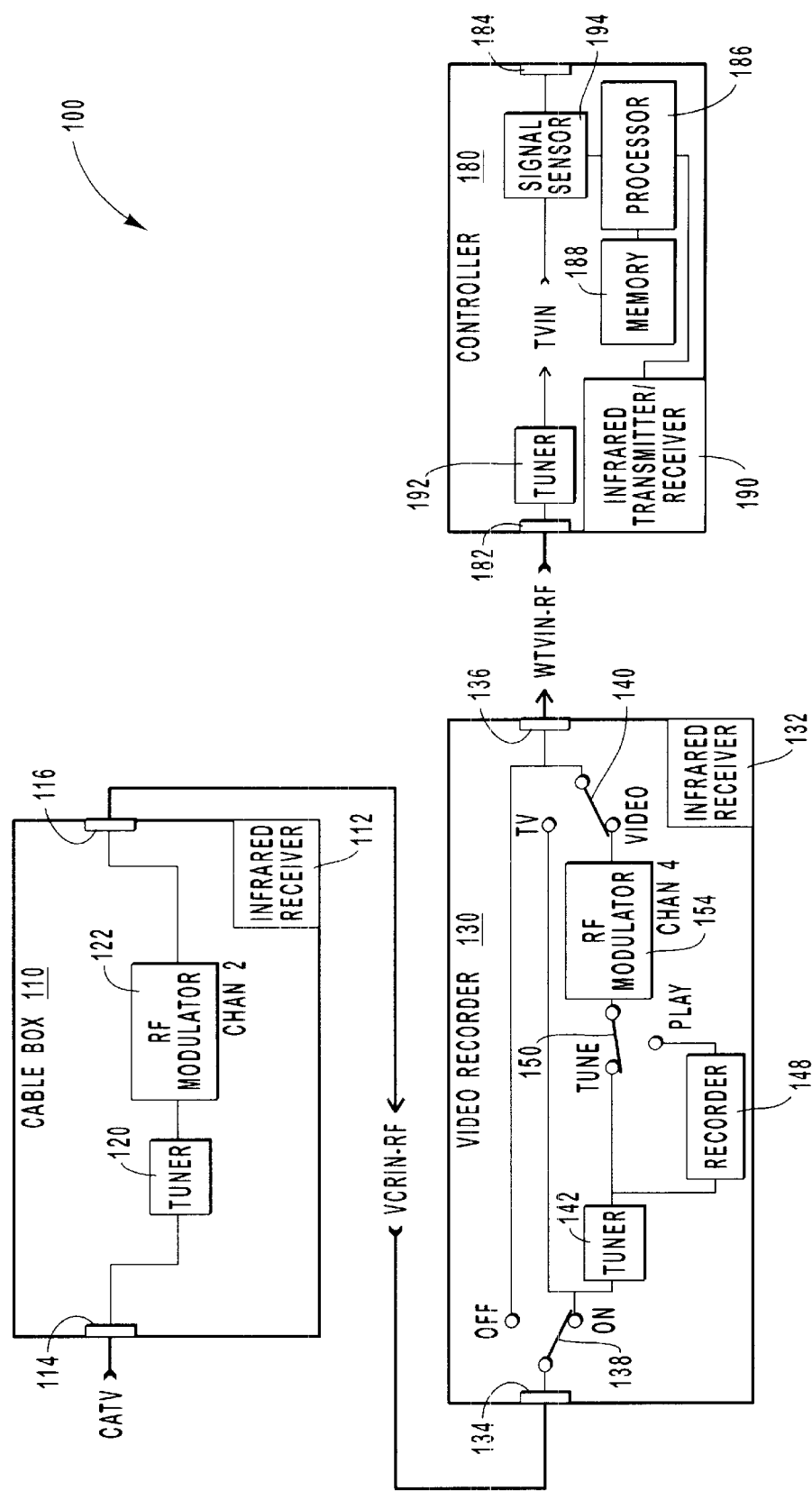
FIG. 4A is a schematic diagram of a configuration of a cable box, video recorder, and controller that process an analog video signal modulated on a radio frequency carrier wave.

FIG. 4A illustrates a configuration of the video system 100 in which the cable box 110 is also included. The cable box 110 includes an input terminal 114 and an output terminal 116. The cable box tuner 120 tunes to one of the channels of the input signal CATV if the cable box 110 is on. Assuming the cable box 110 is on, the cable box tuner 120 provides that tuned signal to a cable box RF modulator 122 which modulates the tuned information on a predetermined channel such as channel 2 that is different than the channel (e.g., channel 4) output from the video recorder RF modulator 154. If the cable box 110 is off, the cable box 110 does not provide a signal. The video recorder 130 and controller 180 of FIG. 4A are structurally similar to the video recorder 130 and controller 180 of FIG. 2A except that the video recorder 130 receives the output signal VCRIN-RF from the cable box 110. Toggle settings needed to properly record or display video data in the configuration of FIG. 4A are the ON/OFF settings of the cable box 10 and video recorder 130, as well as the TV/VIDEO setting of the video recorder 130.

Steps and means for determining the status of the toggle settings of the video recorder 130 and cable box 110 are described with reference to FIG. 4B. The eight possible initial scenarios for these toggle settings are shown in Table 5.

TABLE 5

| Scenario | Cable Box 110 ON/OFF Setting | Video Recorder 130 ON/OFF Setting | Video Recorder 130 TV/VIDEO Setting |
|---|---|---|---|
| 0 | OFF | OFF | VIDEO |
| 1 | OFF | OFF | TV |
| 2 | OFF | ON | VIDEO |
| 3 | OFF | ON | TV |
| 4 | ON | OFF | VIDEO |
| 5 | ON | OFF | TV |
| 6 | ON | ON | VIDEO |
| 7 | ON | ON | TV |

Figure 4B:
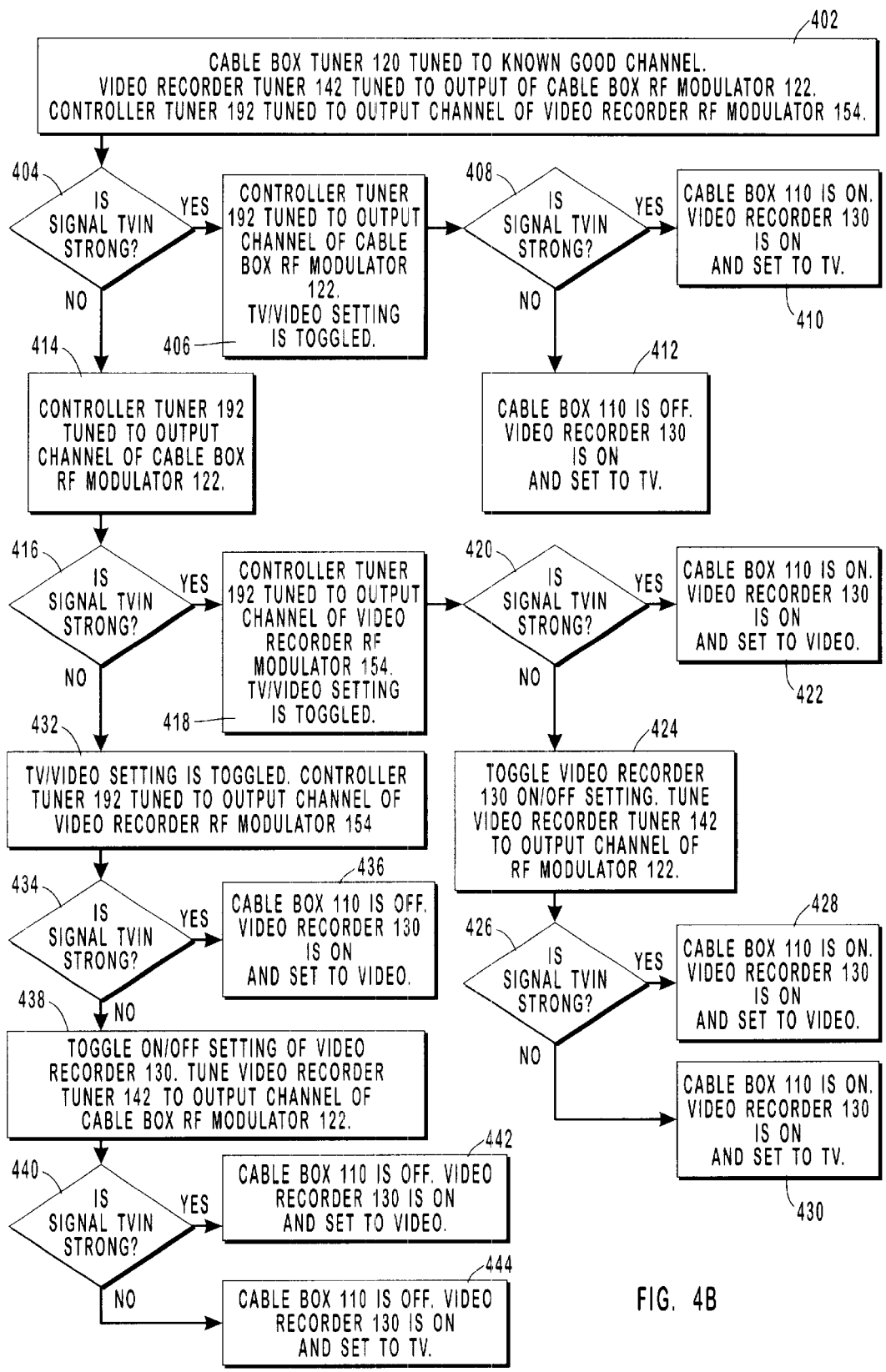
FIG. 4B is a flow chart of a method for determining a status of toggle settings of the cable box and video recorder in the configuration of FIG. 4A.

First, the cable box tuner 120 is tuned to a known good channel such as channel 14, the video recorder tuner 142 is instructed to tune to the output channel of the cable box RF modulator 122 (e.g., channel 2), and the controller tuner 192 is instructed to tune to the output channel of the video recorder RF modulator 154 (e.g., channel 4) (step 402 of FIG. 4B). Tuners 120 and 142 only operate if the respective cable box 110 and video recorder 130 are on.

Next, signal TVIN is monitored (step 404). If signal TVIN is strong, signal WTVIN-RF has a strong channel 4 signal. Since the cable box 110 either does not output a signal, or outputs on channel 2, the only source for a strong channel 4 signal is the video recorder RF modulator 154. Thus, the video recorder 130 would have to be on and set to VIDEO although the cable box ON/OFF setting is still unknown. Thus, of the eight scenarios of Table 5, the two scenarios in which there is a strong signal TVIN in step 404 are shown in Table 6.

TABLE 6

| Scenario | Cable Box 110 ON/OFF Setting | Video Recorder 130 ON/OFF Setting | Video Recorder 130 TV/VIDEO Setting |
|---|---|---|---|
| 2 | OFF | ON | VIDEO |
| 6 | ON | ON | VIDEO |

If signal TVIN is strong in step 404, the controller tuner 192 is tuned to the output channel of the cable box RF modulator 122 (e.g., channel 2) (step 406). Also, a TV/VIDEO setting toggle instruction is sent to the video recorder 130 (step 406) resulting in the two toggled scenarios of Table 7.

TABLE 7

| Scenario | Cable Box 110 ON/OFF Setting | Video Recorder 130 ON/OFF Setting | Video Recorder 130 TV/VIDEO Setting |
|---|---|---|---|
| 2' | OFF | ON | TV |
| 6' | ON | ON | TV |

Next, the signal TVIN is monitored (step 408). If signal TVIN is strong, signal WTVIN-RF has a strong channel 2. Since a good channel 2 signal is only provided if the cable box 110 is on, the processor 186 determines that the cable box 110 is on (and the video recorder 130 is on and set to TV) as in scenario 6' (step 410). Otherwise, the processor 186 determines that the cable box 110 is off (and the video recorder 130 is on and set to TV) as in scenario 2' (step 412).

This description now returns to step 404. Remember that in step 402, the cable box tuner 120 was tuned to a known good channel (e.g., channel 14), the video recorder tuner 142 was tuned to the output channel of the cable box RF modulator 122 (e.g., channel 2), and the controller tuner 192 was tuned to the output channel of the video recorder RF modulator 154 (e.g., channel 4). If signal TVIN is weak in step 404, the signal WTVIN-RF has a weak channel 4. This means that the source of signal WTVIN-RF is not the video recorder RF modulator 154. Thus, the video recorder 130 is not on while set to VIDEO. The six Table 5 scenarios in which there is a weak signal TVIN in step 404 are shown in Table 8.

TABLE 8

| Scenario | Cable Box 110 ON/OFF Setting | Video Recorder 130 ON/OFF Setting | Video Recorder 130 TV/VIDEO Setting |
|---|---|---|---|
| 0 | OFF | OFF | VIDEO |
| 1 | OFF | OFF | TV |
| 3 | OFF | ON | TV |
| 4 | ON | OFF | VIDEO |
| 5 | ON | OFF | TV |
| 7 | ON | ON | TV |

If signal TVIN is weak in step 404, the controller tuner 192 is tuned to the output channel of the cable box RF modulator 122 (e.g., channel 2) (step 414) and signal TVIN is again monitored (step 416). If signal TVIN is strong, then signal WTVIN-RF has a strong channel 2. Thus, the cable box 110 is on allowing its RF modulator 122 to generate a strong channel 2. Furthermore, the video recorder 130 allows the strong channel 2 to pass through the video recorder 130. Thus, the video recorder 130 is either off, or on but set to TV. The three Table 8 scenarios in which these conditions are true are shown in Table 9.

TABLE 9

| Scenario | Cable Box 110 ON/OFF Setting | Video Recorder 130 ON/OFF Setting | Video Recorder 130 TV/VIDEO Setting |
|---|---|---|---|
| 4 | ON | OFF | VIDEO |
| 5 | ON | OFF | TV |
| 7 | ON | ON | TV |

If the signal TVIN is strong in step 416, the controller tuner 192 is tuned to the output channel of the video recorder RF modulator 154 (e.g., channel 4) and a TV/VIDEO setting toggle instruction is sent to the video recorder 130 (step 418). The three scenarios of Table 9 are thus altered as shown in Table 10.

TABLE 10

| Scenario | Cable Box 110 ON/OFF Setting | Video Recorder 130 ON/OFF Setting | Video Recorder 130 TV/VIDEO Setting |
|---|---|---|---|
| 4' | ON | OFF | VIDEO |
| 5' | ON | OFF | TV |
| 7' | ON | ON | VIDEO |

Note that only the TV/VIDEO setting for scenario 7 changed since the video recorder 130 is off in scenarios 4 and 5.

The signal TVIN is again monitored (step 420). Since the cable box RF modulator 122 only generates a signal, if at all, on channel 2, the source of signal WTVIN-RF is the video recorder RF modulator 154 if the signal TVIN is strong. Thus, if signal TVIN is strong, the video recorder 130 is on and set to VIDEO as in scenario 7' of Table 10. Thus, if signal TVIN is strong in step 420, the processor 186 determines that the cable box 110 is on and the video recorder 130 is on and set to VIDEO (step 422).

If signal TVIN is weak in step 420, the source of signal WTVIN-RF is not the video recorder RF modulator 154 since video recorder RF modulator 154 provides a strong channel 4. Thus, if signal TVIN is weak in step 420, the video recorder 130 is off, or the video recorder 130 is on but set to TV. The two Table 10 scenarios in which this is true are shown in Table 11.

TABLE 11

| Scenario | Cable Box 110 ON/OFF Setting | Video Recorder 130 ON/OFF Setting | Video Recorder 130 TV/VIDEO Setting |
|---|---|---|---|
| 4' | ON | OFF | VIDEO |
| 5' | ON | OFF | TV |

Next, the ON/OFF setting of the video recorder 130 is toggled (step 424). Since the video recorder 130 is off in both scenarios 4' and 5', this means that the video recorder 130 is turned on as in the two scenarios of Table 12.

TABLE 12

| Scenario | Cable Box 110 ON/OFF Setting | Video Recorder 130 ON/OFF Setting | Video Recorder 130 TV/VIDEO Setting |
|---|---|---|---|
| 4" | ON | ON | VIDEO |
| 5" | ON | ON | TV |

Also in step 424, the video recorder tuner 142 is tuned to the output channel of the cable box RF modulator 122 since the prior attempts to tune the powered down video recorder 130 are assumed to have been unsuccessful. Next, the signal TVIN is monitored (step 426). Since the controller tuner 192 is still tuned to the output channel of the video recorder RF modulator 154, the signal TVIN is strong in step 426 if the video recorder 130 is on and set to VIDEO as in scenario 4". Thus, if signal TVIN is strong in step 426, the processor 186 determines that the cable box 110 is on, and that the video recorder 130 is on and set to VIDEO (step 428). On the other hand, if the signal TVIN is weak, the processor 186 determines that the cable box 110 is on, and that the video recorder 130 is ON and set to TV (step 430) as in the sole remaining scenario 5" of Table 12.

Remember that steps 418, 420, 422, 424, 426, 428 and 430 are performed only if the signal TVIN is strong in step 416. Also recall that in step 416, the controller tuner 192 is tuned to the output channel of the cable box RF modulator 122. Thus, if signal TVIN is weak in step 416, then the signal WTVIN-RF has a weak channel 2 and is not generated by the cable box RF modulator 122. Thus, if signal TVIN is weak in step 416, the cable box 110 is off. Alternatively, the cable box 110 could be on with the video recorder 130 on and set to VIDEO (does not occur in any Table 8 scenario). The three Table 8 scenarios in which this is true are shown in Table 13.

TABLE 13

| Scenario | Cable Box 110 ON/OFF Setting | Video Recorder 130 ON/OFF Setting | Video Recorder 130 TV/VIDEO Setting |
|---|---|---|---|
| 0 | OFF | OFF | VIDEO |
| 1 | OFF | OFF | TV |
| 3 | OFF | ON | TV |

If signal TVIN is weak in step 416, a TV/VIDEO toggle instruction is sent to the video recorder 130, and the controller tuner 192 is tuned to the output channel of the video recorder RF modulator 154 (e.g., channel 4) (step 432). The toggling results in the three scenarios of Table 13 being altered as shown in Table 14.

TABLE 14

| Scenario | Cable Box 110 ON/OFF Setting | Video Recorder 130 ON/OFF Setting | Video Recorder 130 TV/VIDEO Setting |
|---|---|---|---|
| 0' | OFF | OFF | VIDEO |
| 1' | OFF | OFF | TV |
| 3' | OFF | ON | VIDEO |

The signal TVIN is again monitored (step 434). If signal TVIN is strong, then signal WTVIN-RF has a strong channel 4 and is generated by the video recorder RF modulator 154. This would occur if the video recorder 130 is on and set to VIDEO as in scenario 3' of Table 14. Thus, if signal TVIN is strong in step 434, the processor 186 determines that the cable box 110 is off, and the video recorder 130 is on and set to VIDEO (step 436) as in scenario 3' of Table 14. If the signal TVIN is weak in step 434, the signal WTVIN-RF has a weak channel 4. Thus, video recorder RF modulator 154 is not the source of signal WTVIN-RF. Thus, the video recorder 130 is off, or the video recorder 130 is on but set to TV. The two Table 14 scenarios in which this is true are shown in Table 15.

TABLE 15

| Scenario | Cable Box 110 ON/OFF Setting | Video Recorder 130 ON/OFF Setting | Video Recorder 130 TV/VIDEO Setting |
|---|---|---|---|
| 0' | OFF | OFF | VIDEO |
| 1' | OFF | OFF | TV |

If the signal TVIN is weak in step 434, an instruction to toggle the ON/OFF setting of the video recorder 130 is sent to the video recorder 130 (step 438). In other words, since the video recorder 130 is off in both scenarios of Table 15, the video recorder 130 is turned on as in shown in the corresponding scenarios of Table 16.

TABLE 16

| Scenario | Cable Box 110 ON/OFF Setting | Video Recorder 130 ON/OFF Setting | Video Recorder 130 TV/VIDEO Setting |
|---|---|---|---|
| 0" | OFF | ON | VIDEO |
| 1" | OFF | ON | TV |

Also in step 438, the video recorder tuner 142 is tuned to the output channel of the cable box RF modulator 122. The signal TVIN is again monitored (step 440). If the signal TVIN is strong, signal WTVIN-RF has a strong channel 4 and thus was generated by the video recorder RF modulator 154. Thus, the video recorder 130 would be on and set to VIDEO as in scenario 0" of Table 16. Thus, if the signal TVIN is strong in step 440, the processor 186 determines that the cable box 110 is off, and the video recorder 130 is on and set to VIDEO (step 442). Otherwise, the processor 186 determines that the cable box 110 is off, and the video recorder 130 is on and set to TV (step 444). In this manner, the processor 180 determines the TV/VIDEO setting of the video recorder 130 and the ON/OFF setting of the cable box 110 and video recorder 130.

Figure 5A:
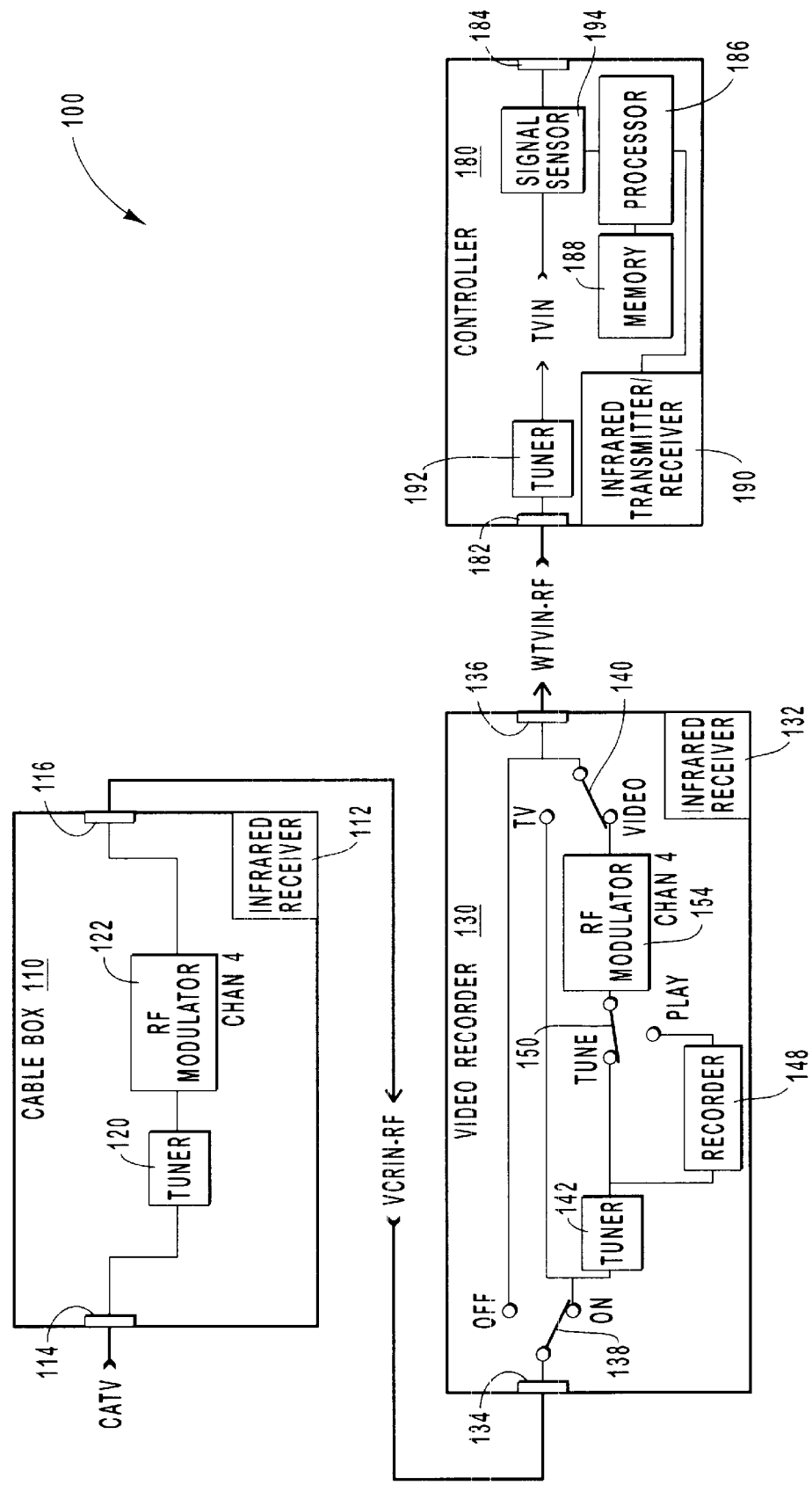
FIG. 5A is a schematic diagram of a configuration of a cable box, video recorder, and controller that process an analog video signal modulated on a carrier wave in which the RF modulators of the cable box and video recorder modulate on the same channel.

FIG. 5A illustrates a configuration of the video system 100 similar to the configuration of FIG. 4A except that the cable box RF modulator 122 is set to modulate on the same channel (e.g., channel 4) as the video recorder RF modulator 154. Settings needed to properly record or display video data in the configuration of FIG. 5A are the ON/OFF setting of the cable box 110, and the ON/OFF and TV/VIDEO settings of the video recorder 130.

Steps and means for determining a status of the toggle settings of the video recorder 130 and cable box 110 are described with reference to FIG. 5B. Initially, the eight possible scenarios for these settings are shown in Table 17.

TABLE 17

| Scenario | Cable Box 110 ON/OFF Setting | Video Recorder 130 ON/OFF Setting | Video Recorder 130 TV/VIDEO Setting |
|---|---|---|---|
| 0 | OFF | OFF | VIDEO |
| 1 | OFF | OFF | TV |
| 2 | OFF | ON | VIDEO |
| 3 | OFF | ON | TV |
| 4 | ON | OFF | VIDEO |
| 5 | ON | OFF | TV |
| 6 | ON | ON | VIDEO |
| 7 | ON | ON | TV |

First, the cable box tuner 120 is tuned to a known good channel (e.g., channel 14), the video recorder tuner 142 is tuned to the output channel of the cable box RF modulator 122 (e.g., channel 4), and the controller tuner 192 is tuned to the output channel of the video recorder RF modulator 154 (e.g., also channel 4) (step 505). The signal TVIN is then monitored (step 510). If the signal TVIN is weak, signal WTVIN-RF has a weak channel 4. Thus, neither the cable box RF modulator 122 nor the video recorder RF modulator 154 generated the signal WTVIN-RF. This is the case when both the cable box 110 and the video recorder 130 are off, or when the cable box 110 is off and the video recorder 130 is on but set to TV as in the three Table 17 scenarios listed in Table 18.

TABLE 18

| Scenario | Cable Box 110 ON/OFF Setting | Video Recorder 130 ON/OFF Setting | Video Recorder 130 TV/VIDEO Setting |
|---|---|---|---|
| 0 | OFF | OFF | VIDEO |
| 1 | OFF | OFF | TV |
| 3 | OFF | ON | TV |

If the signal TVIN is weak in step 510, the controller 180 toggles the TV/VIDEO setting of the video recorder 130 (step 515) altering the three Table 18 scenarios as shown in Table 19.

TABLE 19

| Scenario | Cable Box 110 ON/OFF Setting | Video Recorder 130 ON/OFF Setting | Video Recorder 130 TV/VIDEO Setting |
|---|---|---|---|
| 0' | OFF | OFF | VIDEO |
| 1' | OFF | OFF | TV |
| 3' | OFF | ON | VIDEO |

Next, the signal TVIN is monitored for strength (step 520). If signal TVIN is strong, signal WTVIN-RF has a strong channel 4. Thus, the source of the signal WTVIN-RF is either the cable box RF modulator 122 or the video recorder RF modulator 154. This would be the case if the cable box is on (not true in any Table 19 scenario), or if the cable box 110 is off but the video recorder 130 is on and set to VIDEO as in scenario 3' of Table 19. Thus, if signal TVIN is strong in step 520, the processor 186 determines that the cable box 110 is off, and that the video recorder 130 is on and set to VIDEO (step 525).

If signal TVIN is weak in step 520, then the cable box 110 and the video recorder 130 are either both off, or the cable box 110 is off and the video recorder 130 is on and set to TV as in the two Table 19 scenarios listed in Table 20.

TABLE 20

| Scenario | Cable Box 110 ON/OFF Setting | Video Recorder 130 ON/OFF Setting | Video Recorder 130 TV/VIDEO Setting |
|---|---|---|---|
| 0' | OFF | OFF | VIDEO |
| 1' | OFF | OFF | TV |

If the signal TVIN is weak in step 520, then the controller 180 toggles the video recorder 130 ON/OFF setting altering the two Table 20 scenarios (step 530). In other words, since the video recorder 130 is off in both Table 20 scenarios, the video recorder 130 is turned on as shown in Table 21. The video recorder tuner 142 is also tuned to the output channel of the cable box RF modulator 122 (step 530).

TABLE 21

| Scenario | Cable Box 110 ON/OFF Setting | Video Recorder 130 ON/OFF Setting | Video Recorder 130 TV/VIDEO Setting |
|---|---|---|---|
| 0" | OFF | ON | VIDEO |
| 1" | OFF | ON | TV |

Next, the signal TVIN is again monitored for signal strength (step 535). The signal is strong in scenario 0" of Table 21 since the video recorder RF modulator 154 is the source of the signal WTVIN-RF. Thus, if the signal TVIN is strong in step 535, the processor 186 determines that the cable box 110 is off, and the video recorder is on and set to VIDEO (step 540). Otherwise, the processor 186 determines that the cable box 110 is off, and the video recorder is on and set to TV (step 545).

Recall that steps 515, 520, 525, 530, 535, 540 and 545 are performed if the signal TVIN is weak in step 510. If the signal TVIN in strong in step 510, then signal WTVIN-RF must be generated by either the cable box RF modulator 122 or the video recorder RF modulator 154. Thus, the cable box 110 is on, or the cable box 110 is off but the video recorder 130 is on and set to VIDEO as in the five Table 17 scenarios shown in Table 22.

TABLE 22

| Scenario | Cable Box 110 ON/OFF Setting | Video Recorder 130 ON/OFF Setting | Video Recorder 130 TV/VIDEO Setting |
|---|---|---|---|
| 2 | OFF | ON | VIDEO |
| 4 | ON | OFF | VIDEO |
| 5 | ON | OFF | TV |
| 6 | ON | ON | VIDEO |
| 7 | ON | ON | TV |

If the signal TVIN is weak in step 510, the controller 180 toggles the TV/VIDEO setting of the video recorder 130 (step 550) altering the five Table 22 scenarios as shown in Table 23.

TABLE 23

| Scenario | Cable Box 110 ON/OFF Setting | Video Recorder 130 ON/OFF Setting | Video Recorder 130 TV/VIDEO Setting |
|---|---|---|---|
| 2' | OFF | ON | TV |
| 4' | ON | OFF | VIDEO |
| 5' | ON | OFF | TV |
| 6' | ON | ON | TV |
| 7' | ON | ON | VIDEO |

The signal TVIN is then monitored for signal strength (step 555). If the signal is weak in step 555, then the cable box 110 must be off, but the video recorder 130 can be on and set to TV. Thus, if signal TVIN is weak in step 555, the processor 186 determines that the cable box 110 is off, and the video recorder 130 is on and set to TV (step 560) as in scenario 2' of Table 23. If the signal TVIN is strong in step 555, then the cable box is either on, or the cable box 110 is off, but the video recorder 130 is on and set to VIDEO as in the four Table 23 scenarios shown in Table 24.

TABLE 24

| Scenario | Cable Box 110 ON/OFF Setting | Video Recorder 130 ON/OFF Setting | Video Recorder 130 TV/VIDEO Setting |
|---|---|---|---|
| 4' | ON | OFF | VIDEO |
| 5' | ON | OFF | TV |
| 6' | ON | ON | TV |
| 7' | ON | ON | VIDEO |

If the signal TVIN is strong in step 555, then the cable box 110 ON/OFF setting is toggled and the cable box tuner 120 is tuned to a known good channel (step 565) altering the four Table 24 scenarios as shown below in Table 25.

TABLE 25

| Scenario | Cable Box 110 ON/OFF Setting | Video Recorder 130 ON/OFF Setting | Video Recorder 130 TV/VIDEO Setting |
|---|---|---|---|
| 4" | OFF | OFF | VIDEO |
| 5" | OFF | OFF | TV |
| 6" | OFF | ON | TV |
| 7" | OFF | ON | VIDEO |

Then the signal TVIN is monitored for signal strength (step 570). If the signal TVIN is strong, then the cable box 110 is either on (not true in Table 25), or the cable box 110 is off but the video recorder is on and set to VIDEO as in scenario 7" of Table 25. Thus, if the signal TVIN is strong in step 570, the processor 186 determines that the cable box 110 is off, and the video recorder 130 is on and set to VIDEO (step 575). If the signal TVIN is weak in step 570, then the cable box 110 and video recorder 130 are either both off, or the cable box 110 is off, but the video recorder is on and set to TV. This is the case in the three Table 25 scenarios shown in Table 26.

TABLE 26

| Scenario | Cable Box 110 ON/OFF Setting | Video Recorder 130 ON/OFF Setting | Video Recorder 130 TV/VIDEO Setting |
|---|---|---|---|
| 4" | OFF | OFF | VIDEO |
| 5" | OFF | OFF | TV |
| 6" | OFF | ON | TV |

Note that the three Table 26 scenarios are the same as the three Table 18 scenarios that existed before steps 520, 525, 530, 535, 540 and 545. Thus, if the signal TVIN is weak in step 570, steps 520, 525, 530, 535, 540 and 545 are repeated as described above for the Table 18 scenarios. Thus, the cable box 110 ON/OFF setting, and the video recorder 130 ON/OFF and TV/VIDEO settings are determined.

Figure 6A:
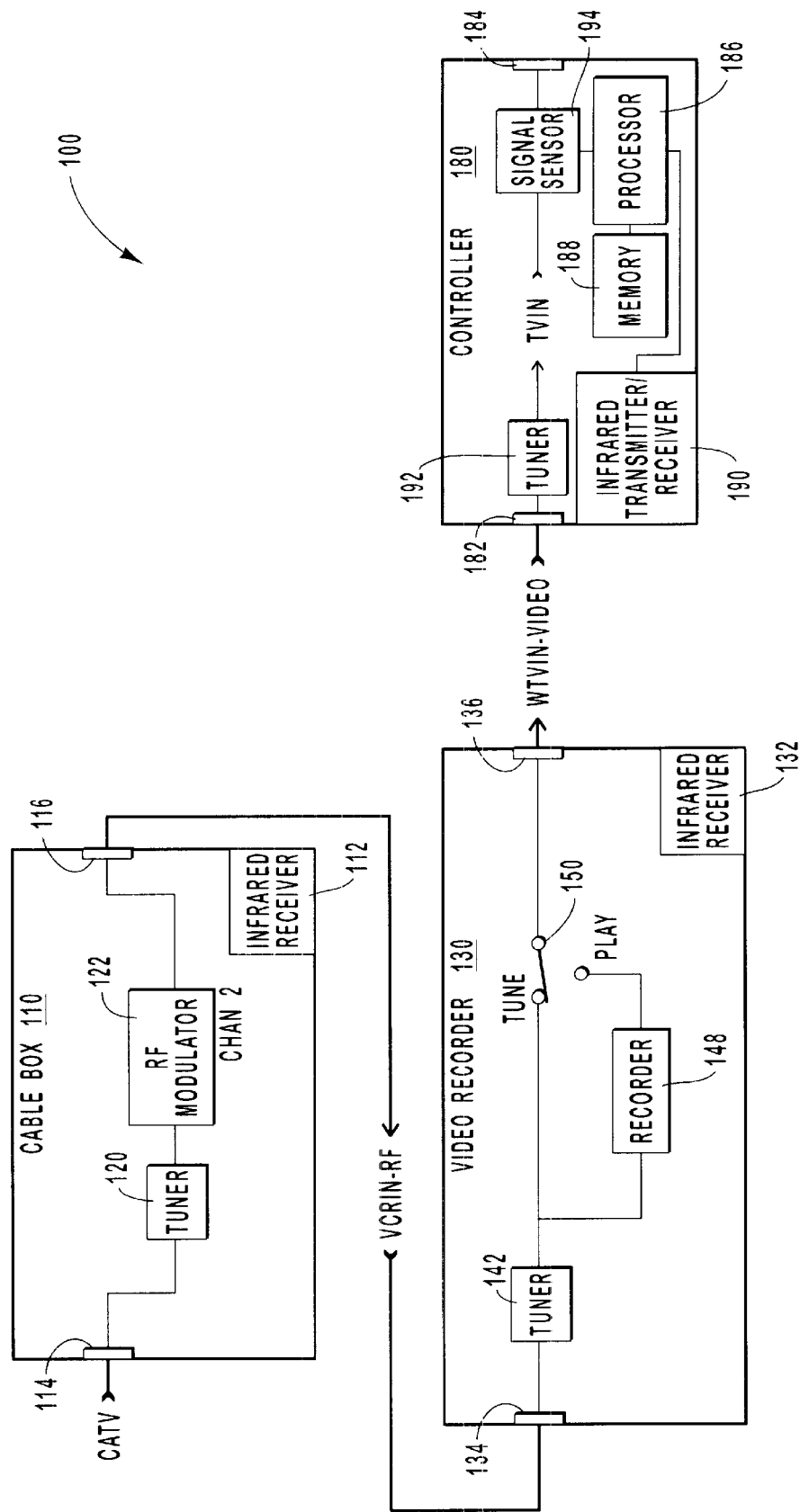
FIG. 6A is a schematic diagram of a configuration of a cable box, video recorder, and controller in which the video recorder provides an analog VIDEO signal to the controller.

FIG. 6A illustrates another configuration of the video system 100. The cable box 110 of FIG. 6A is structure similar to the cable box 110 of FIG. 5A. The video recorder 130 of FIG. 6A is structure similar to the video recorder 130 of FIG. 3A. The cable box 110 outputs an RF signal VCRIN-RF on, for example, channel 4. The video recorder 130 provides a VIDEO signal WTVIN-VIDEO to the controller 180. Toggle settings needed to properly record or display video data in the configuration of FIG. 6A are the ON/OFF settings of the cable box 110 and video recorder 130.

Steps and means for determining a toggle setting of the video recorder 130 are described with reference to FIG. 6B. First, the processor 186 determines whether there is any VIDEO signal in signal TVIN (step 605). If there is no VIDEO signal generated by the video recorder 130, then the video recorder 130 is off. If there is no VIDEO signal, the controller 180 toggles the video recorder 130 ON/OFF status (step 610) to turn the video recorder on. The method then proceeds from step 610 to step 615. If there was a VIDEO signal in step 605, the video recorder 130 is already on and thus the method proceeds directly from step 605 to step 615. Either way, the video recorder 130 is likely on in step 615.

The controller 180 then tunes the video recorder tuner 142 to the output channel of the cable box RF modulator 122 (e.g., channel 4) (step 615). After the sync position is noted (step 620), the cable box tuner 120 is instructed to change channels sequentially to three known good channels (step 625). Signal TVIN is monitored for a change in sync position (step 630). If the cable box 110 is off, there will be no response to such the tuning instruction. Thus, the sync position will not change. On the other hand, if the cable box 110 is on, there will be a channel change of the cable box tuner 120 and thus the sync position will change. Thus, if the sync position changed in step 630, the processor 186 determines that both the cable box 110 and video recorder 130 are on (step 635). Otherwise, the cable box 110 ON/OFF setting is toggled to turn the cable box 110 on (step 640) and the cable box tuner 120 is tuned to three known good channels (step 640). If the sync position still does not change, the video recorder 130 is determined to still be off (step 650).

Figure 7A:
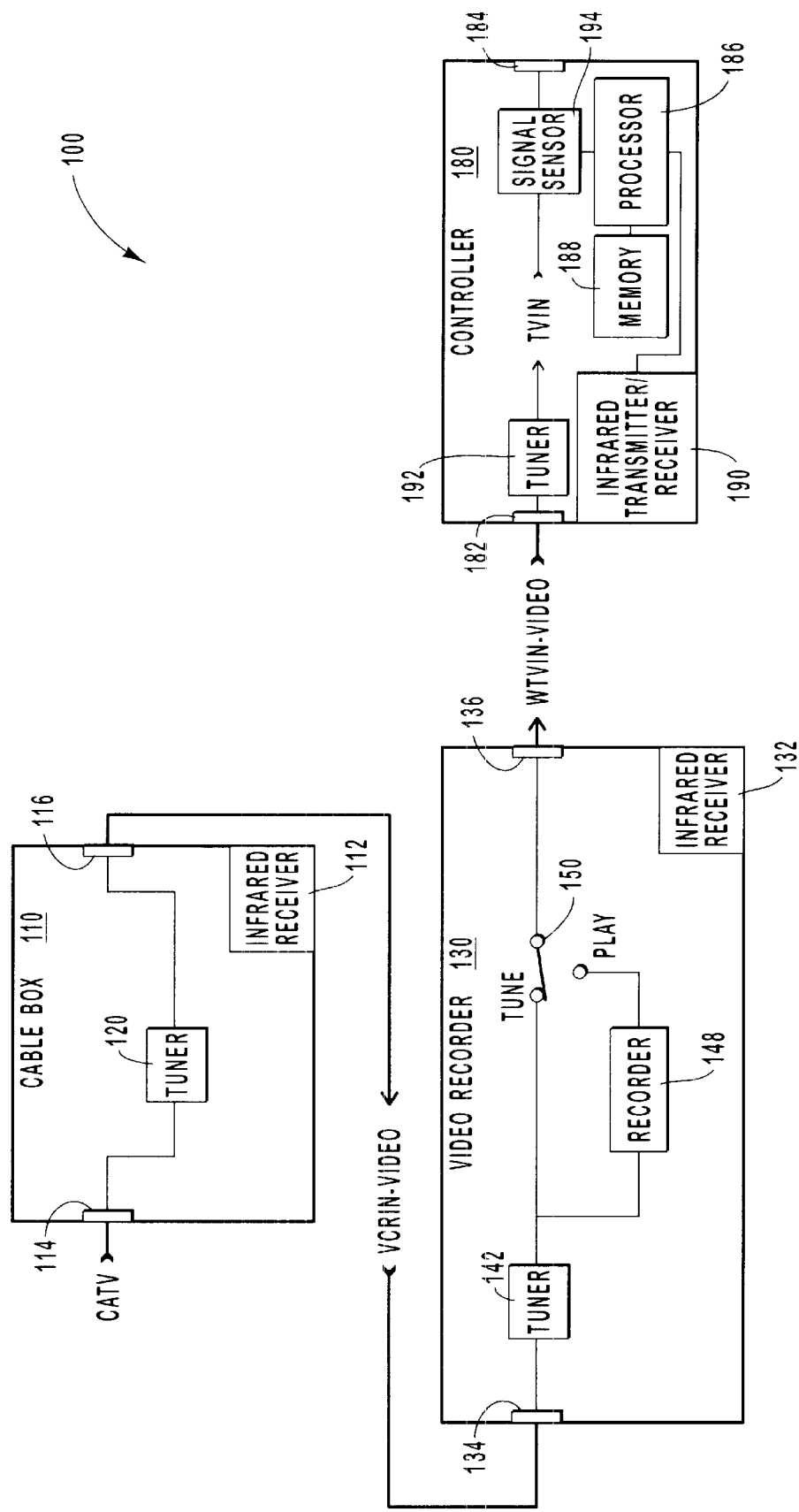
FIG. 7A is a schematic diagram of a configuration of a cable box, video recorder, and controller that process VIDEO signals.

FIG. 7A illustrates another configuration of the video system 100. The cable box 110 of FIG. 7A need not have a cable box RF modulator 122 since the cable box 110 output is in VIDEO format. The input terminal 134 of the video recorder 130 is coupled directly to the output terminal 116 of the cable box 110. Settings needed to properly record or display video data in the configuration of FIG. 7A are the ON/OFF setting of the cable box 110 and video recorder 130. Steps and means for determining a status of a toggle setting of the video recorder 130 are described with reference to FIG. 7B.

First, the cable box tuner 120 is tuned to a known good channel (step 705). Processor 186 then determines whether there is any VIDEO signal in signal TVIN (step 710). If not, then the video recorder 130 is off and instructions are sent to toggle the video recorder 130 power to on (step 715) and the method proceeds to step 720. If there is a VIDEO signal in signal TVIN in step 710, the video recorder 130 is on and the method proceeds directly to step 720. Thus, at step 720, the video recorder 130 should be on.

Signal TVIN is again checked for a VIDEO signal (step 720). If not present, the processor 186 determines that an error occurred (step 725) since the video recorder 130 should generate a VIDEO signal when on. If a VIDEO signal is present in signal TVIN in step 720, the sync position is noted and the cable box tuner 120 is tuned to three known good channels (step 730). The processor 186 determines if the sync position changed (step 735). If so, the processor 186 determines that both the cable box 110 and the video recorder 130 are on (step 740). If not, the tuner input switch is advanced to the next input to the video recorder tuner 142 (step 745).

The method repeats steps 730, 735, 740, and 745 to determine if the cable box 110 is also on. If the sync position still has not moved in step 735, the VIDEO input switch is advanced to the next input to the video recorder tuner 142 (step 740). If, after repeating steps 730, 735, 740, and 745 a third time, the sync position still has not changed, the cable box 110 is probably off since video recorder tuners typically do not have more than three input terminals. Next, the cable box 110 power is toggled (step 750) to likely turn the cable box 110 on. Steps 730, 735, 740 and 745 are repeated three more times, one time for each input terminal, to determine if the sync position changes in response to channel changes in the cable box tuner 120. If there still is no sync position change, the processor determines that an error has occurred. During the repeating of step 735, if the sync position ever changes, the processor 186 determines that the cable box 110 and video recorder 130 are both on.

Thus, the above describes means and steps for determining the ON/OFF setting of the video recorder 130 as well as other settings needed to record or display an image such as the ON/OFF setting of the cable box 110 and the TV/VIDEO setting of the video recorder 130.

The principles of the present invention include tuning the cable box 110 and video recorder 130 and monitoring the resulting signal TVIN. From these observations, and by further toggling the settings of the cable box 110 and video recorder 130 if needed, the controller 180 determines the toggle setting status. The methods described with respect to FIGS. 2B, 3B, 4B, 5B, 6B and 7B are only examples of how the controller 180 can determine the various toggle settings of the cable box 110 and video recorder 130. Numerous variations from these specific methods will be enabled to one skilled in the art after reviewing this description.

Figure 2B:
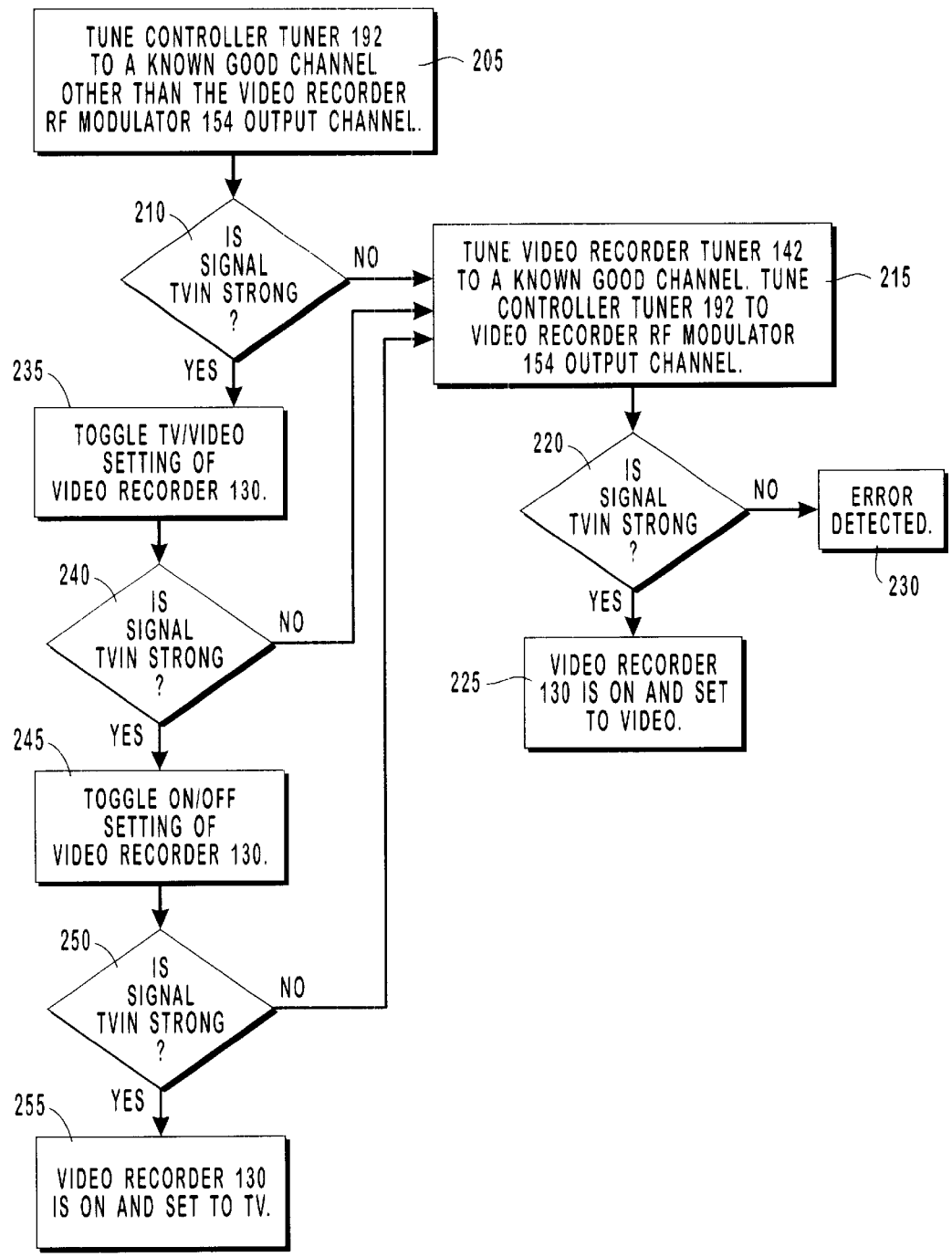
FIG. 2B is a flow chart of a method for determining a status of toggle settings of the video recorder in the configuration of FIG. 2A.

For example, one skilled in the art will realize from this description that in the method of FIG. 2B, steps 235 and 245 may be reverse in which case step 255 determines that the video recorder 130 is off and set to VIDEO. However, an effort has been made in the methods of FIGS. 2B, 3B, 4B, 5B, 6B, and 7B to reduce the power toggling and to not turn the cable box 110 or video recorder 130 off unnecessarily. Minimization of power toggling is desirable since turning devices on and off can reduce the life of the device and is often annoying to the user.

In FIG. 2B, the ON/OFF status of the video recorder 130 is toggled only once in step 245. However, the video recorder 130 is off if the signal is strong in step 240, thus step 245 only turns the video recorder 130 on. Since the video recorder 130 likely needed to be turned on anyway to perform the desired function, the video recorder 130 is not turned off unnecessarily.

Figure 3B:
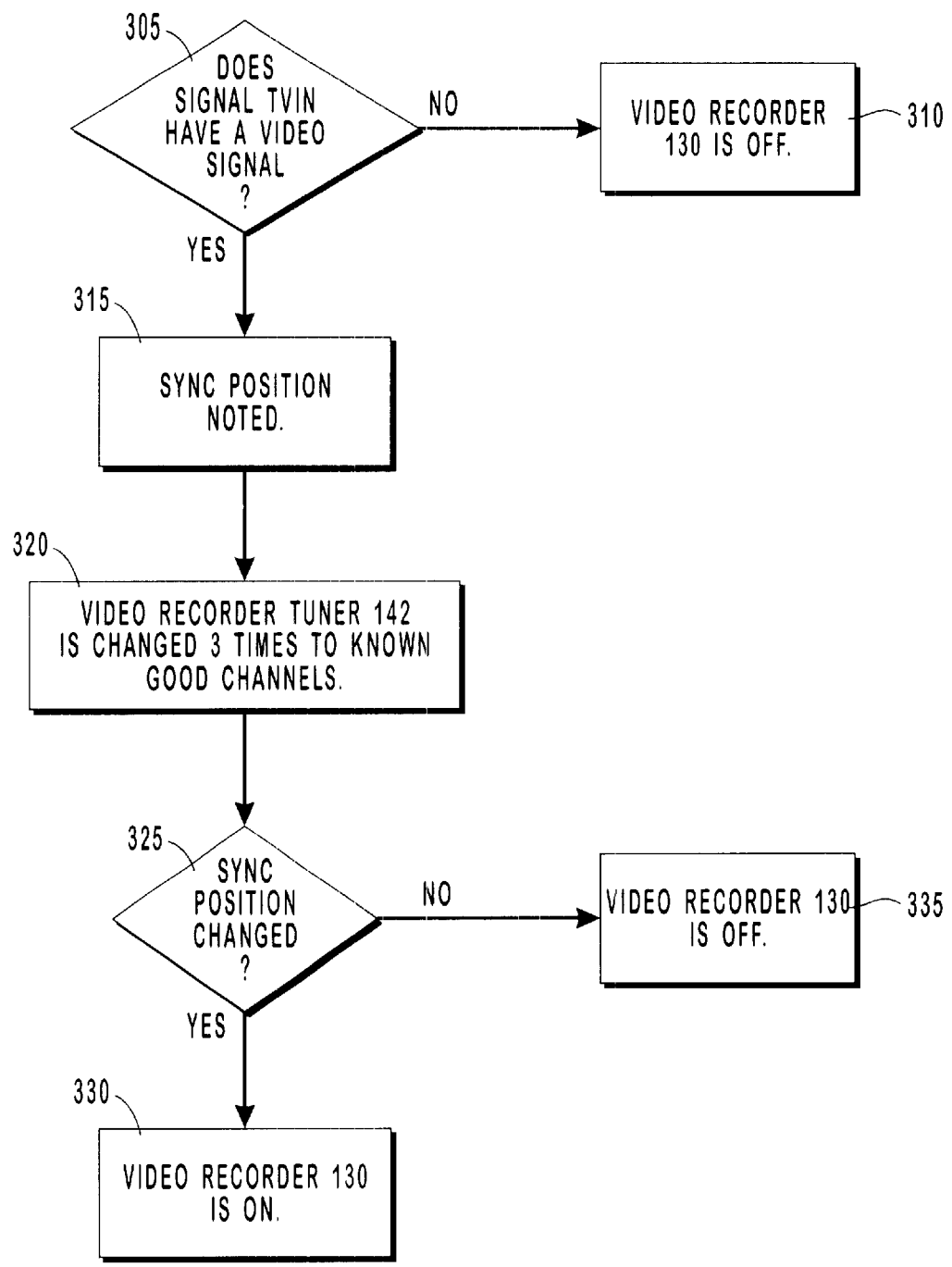
FIG. 3B is a flow chart of a method for determining a status of toggle settings of the video recorder in the configuration of FIG. 3A.

In FIG. 3B, the ON/OFF status of the video recorder 130 is not toggled.

In FIG. 4B, the ON/OFF setting of the video recorder 130 is toggled at most once. This toggling may occur in step 424 or in step 438 depending on the logical path flow within the flowchart of FIG. 4B. In steps 424 and 438, the video recorder 130 is turned on and thus no unnecessary power toggling occurred assuming the video recorder 130 would have to be turned on anyway.

Figure 5B:
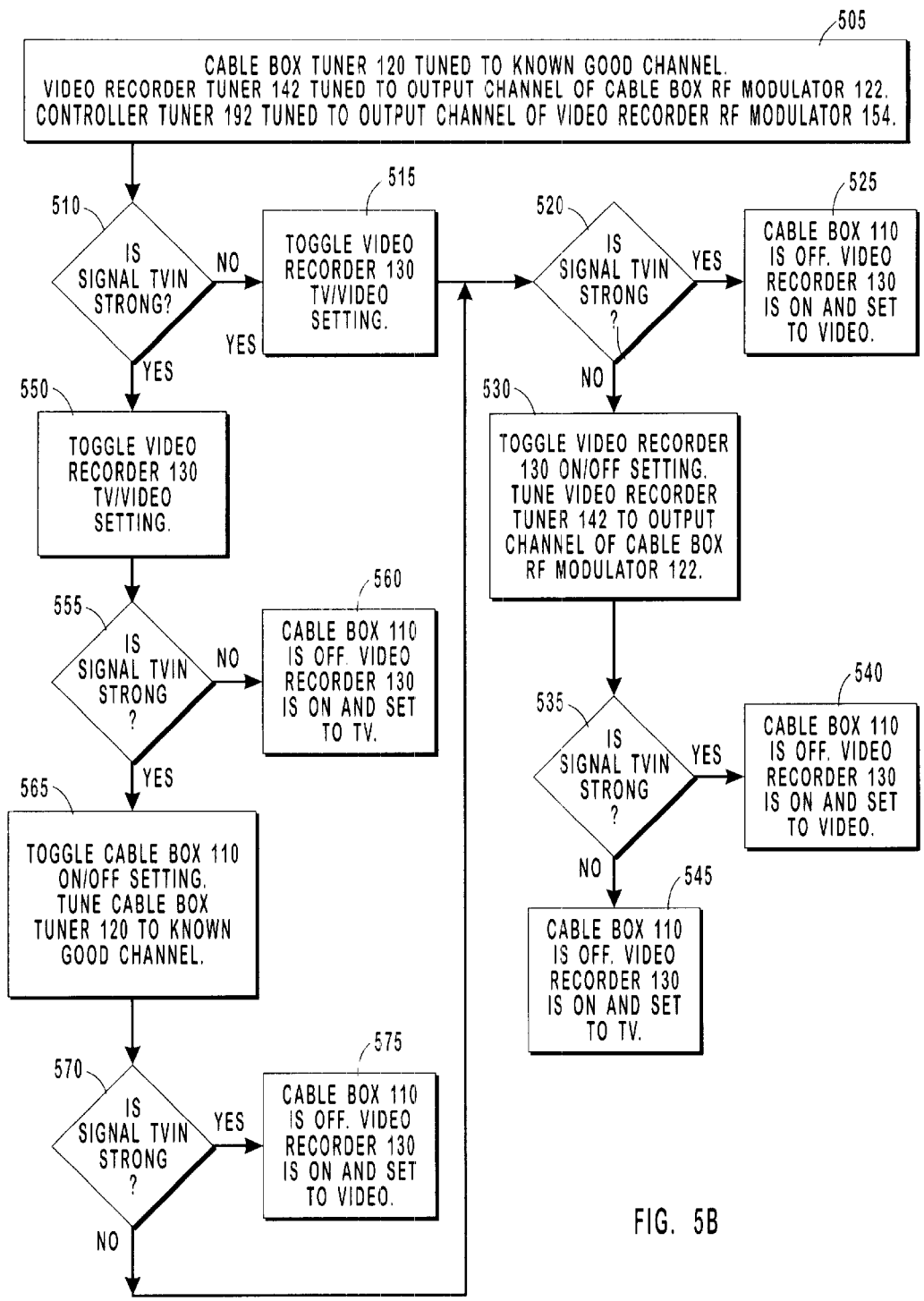
FIG. 5B is a flow chart of a method for determining a status of toggle settings of the cable box and video recorder in the configuration of FIG. 5A.

In FIG. 5B, the ON/OFF settings of the cable box 110 and video recorder 130 are toggled in respective steps 565 and 530.

Figure 6B:
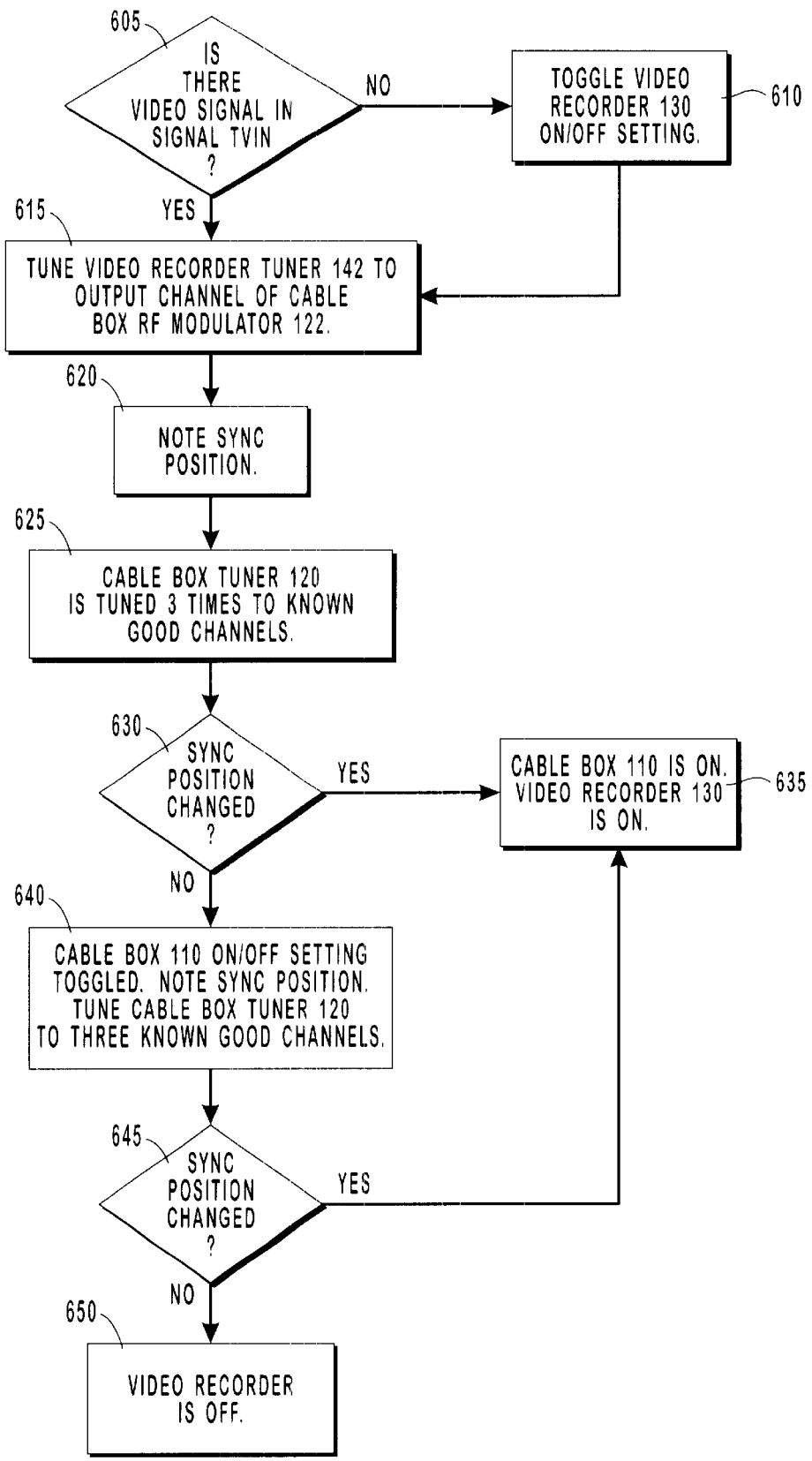
FIG. 6B is a flow chart showing a method for determining settings of the cable box and video recorder in the configuration of FIG. 6A.

In FIG. 6B, the ON/OFF setting of the video recorder 130 is toggled once to turn the video recorder 130 on in step 610. The ON/OFF setting of the cable box 110 is toggled once in step 640 to likely turn the cable box 110 on.

Figure 7B:
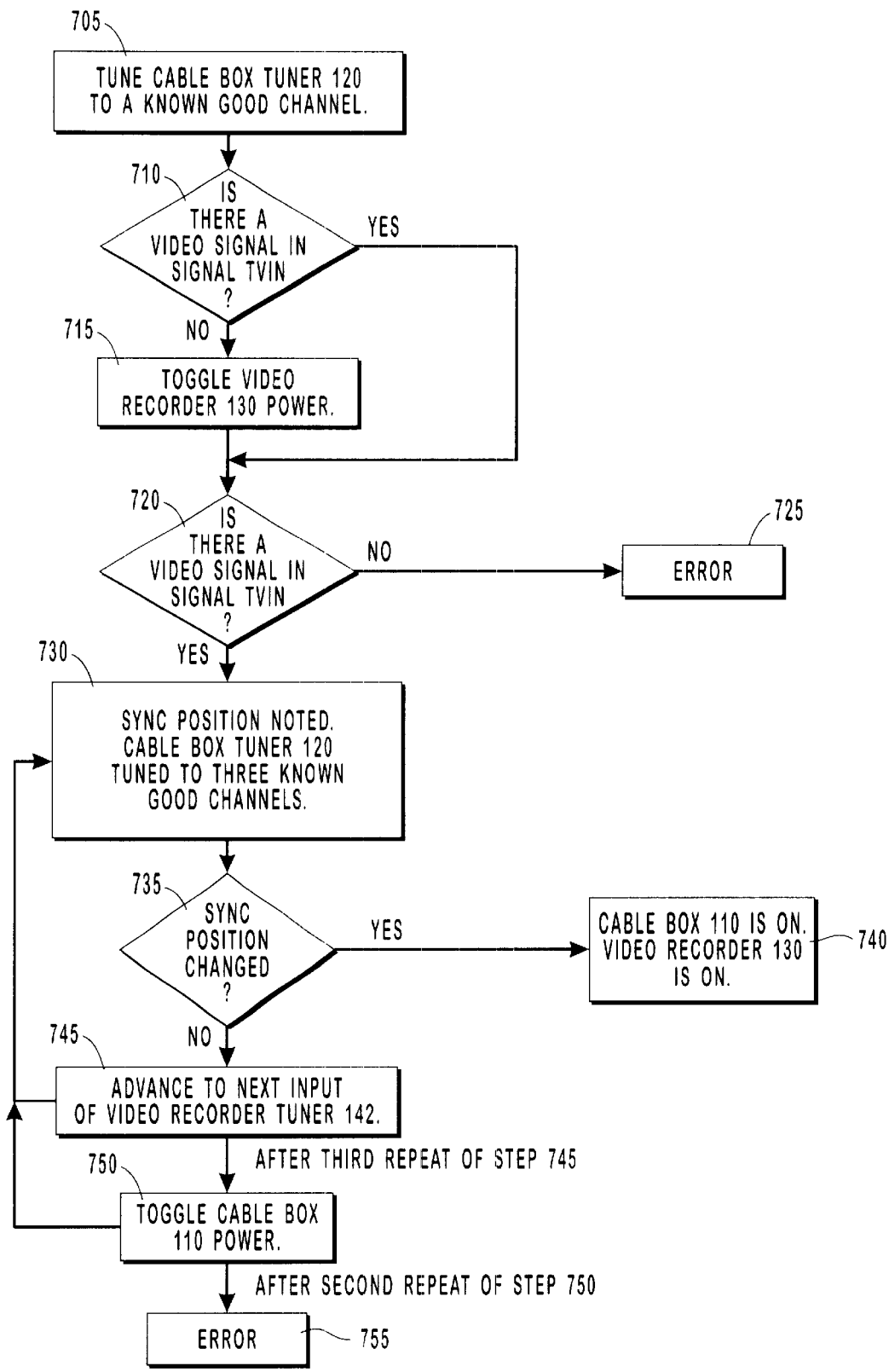
FIG. 7B is a flow chart showing a method for determining settings of the cable box and video recorder of FIG. 7A.

In FIG. 7B, the ON/OFF setting of the cable box 110 and video recorder 130 are toggled to likely turn the devices on.

After the various settings are determined as described with reference to FIGS. 2B, 3B, 4B, 5B, 6B and 7B, the cable box 110 is instructed to toggle the toggle settings if appropriate to perform a programmed operation. Also, the video recorder 130 is instructed to toggle the ON/OFF and/or TV/VIDEO setting if appropriate to perform the programmed operation. The tuners of the cable box 110 and video recorder 130 are also tuned as appropriate for the desired operation.

For example, for a record operation in the configuration of FIG. 2A, the video recorder 130 should be on and tuned to the desired channel. For a display operation of FIG. 2A, the video recorder 130 should either be off with the controller tuner 192 tuned to the desired channel, or the video recorder 130 should be on and set to VIDEO with the controller tuner 192 tuned to the output channel of the video recorder RF modulator 154.

For a record or display operation in FIG. 3A, the video recorder 130 should be on and tuned to the desired channel.

For a record or display operation in FIGS. 4A and 5A, the cable box 110 should be on and tuned to the desired channel. For a record operation, the video recorder 130 should be on with the video recorder tuner 142 tuned to the output channel of the cable box RF modulator 122. For a display operation, if the controller tuner 192 is tuned to the output channel of the cable box RF modulator 122, the video recorder 130 may be off, or the video recorder 130 may be on but set to TV. If the controller tuner 192 is tuned to the output channel of the video recorder RF modulator 154, the video recorder may be on, tuned to the output channel of the cable box RF modulator 122, and set to VIDEO.

For a record or display operation in FIG. 6A, the cable box 110 should be on and tuned to the desired channel, and the video recorder 130 should be on and tuned to the output channel of the cable box RF modulator 122.

For a record or display operation in FIG. 7A, the cable box 110 and video recorder 130 should both be on.

The video system 100 also includes a means for transmitting setting toggle instructions to the video recorder 130 and cable box 110. This means may include the infrared transmitter 190 of the controller generating infrared instructions received by the infrared receivers 132, 112. Alternatively, instructions may be sent to the receivers 132, 112 as electromagnetic waves at a frequency other than in the infrared range. Also, the instructions may be sent to the receiver 132 over a conductor such as a cable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In video system that includes a television set, a multi-channel video signal receiver, as for example a cable box, a video recorder and a controller for controlling the signal input to the television set, a computer-readable medium having computer-executable instructions for implementing within the video system a method of automatically detecting and correctly setting any toggle settings required at the video recorder when a user inputs by remote control or otherwise an instruction to have the video system perform a particular function, as for example recording or displaying a television program, and wherein the method is comprised of the following steps:

receiving at the controller an instruction sent by a user to have the video system perform a desired function;

when the toggle setting cannot be set by simply issuing a command to the video recorder because a subsequent status of the toggle setting depends on the initial status of the toggle setting, then determining an initial status of the toggle setting that needs to be properly set in order to perform the desired function;

the controller then automatically determining without input from the user whether any toggle setting at the video recorder is required to be changed in order to have the video system perform the desired function; and the controller thereafter transmitting without input from the user a toggle instruction to the video recorder if the toggle setting of the video recorder needs to be toggled for the video system to perform the desired function.

2. The computer-readable medium of claim 1, wherein the toggle setting is an ON/OFF setting of the video recorder, wherein the video recorder comprises a video cassette recorder (VCR), wherein the computer-executable instructions are further for performing the following steps:

determining a status of a TV/VIDEO setting of the VCR;

ascertaining whether the TV/VIDEO setting of the VCR needs to be toggled for the video system to perform the function; and transmitting a TV/VIDEO toggle instruction to the VCR if the TV/VIDEO setting of the VCR needs to be toggled for the video system to perform the function.

3. The computer-readable medium of claim 2, wherein the computer-executable instructions are further for performing the following steps;

determining a status of an ON/OFF setting of a cable box;

ascertaining whether the ON/OFF setting of the cable box needs to be toggled for the video system to perform the function; and transmitting an ON/OFF toggle instruction to the cable box if the ON/OFF setting of the cable box needs to be toggled for the video system to perform the function.

4. The computer-readable medium of claim 1, wherein the computer-executable instructions are further for performing the following steps;

determining a status of an ON/OFF setting of a cable box;

ascertaining whether the ON/OFF setting of the cable box needs to be toggled for the video system to perform the function; and transmitting an ON/OFF toggle instruction to the cable box if the ON/OFF setting of the cable box needs to be toggled for the video system to perform the function.

5. The computer-readable medium of claim 1, wherein the function comprises a record operation.

6. The computer-readable medium of claim 1, wherein the function comprises a display operation.

7. The computer-readable medium of claim 1, wherein the computer-executable instructions for determining a status of a toggle setting of a video recorder of a video system comprise instructions for performing the following steps:

monitoring a video signal provided by the video recorder; and determining if the video signal has a predetermined characteristic.

8. The computer-readable medium of claim 1, wherein the computer-executable instructions for determining a status of a toggle setting of a video recorder of a video system comprise instructions for performing the following steps:

toggling a setting of the video recorder;

monitoring a video signal provided by the video recorder before toggling;

determining if the video signal provided by the video recorder before toggling has a predetermined characteristic;

monitoring the video signal provided by the video recorder after toggling; and determining if the video signal provided by the video recorder after toggling has the predetermined characteristic.

9. The computer-readable medium of claim 1, wherein the computer-executable instructions for determining a status of a toggle setting of a video recorder of a video system comprise instructions for performing the following steps:

noting a sync position of a signal in a controller;

sequentially tuning to a plurality of good channels; and determining if the sync position changed while sequentially tuning to the plurality of known good channels.

10. The computer-readable medium of claim 9, wherein the computer-executable instructions for sequentially tuning to a plurality of good channels comprise instructions for performing the following step:

sequentially tuning to three known good channels.

11. The computer-readable medium of claim 9, wherein the computer-executable instructions for sequentially tuning to a plurality of good channels comprise instructions for performing the following step:

sequentially tuning to a plurality of channels that are represented as non-solid screens.

12. In video system that includes a television set, a multi-channel video signal receiver, as for example a cable box, a video recorder and a controller for controlling the signal input to the television set, a method of automatically detecting and correctly setting any toggle settings required at the video recorder when a user inputs by remote control or otherwise an instruction to have the video system perform a particular function, as for example recording or displaying a television program, and wherein the method is comprised of steps for:

receiving at the controller an instruction sent by a user to have the video system perform a desired function;

when the toggle setting cannot be set by simply issuing a command to the video recorder because a subsequent status of the toggle setting depends on the initial status of the toggle setting, then determining an initial status of the toggle setting that needs to be properly set in order to perform the desired function;

the controller then automatically determining without input from the user whether any toggle setting at the video recorder is required to be changed in order to have the video system perform the desired function; and the controller thereafter transmitting without input from the user a toggle instruction to the video recorder if the toggle setting of the video recorder needs to be toggled for the video system to perform the desired function.

13. The method of claim 12, wherein the video recorder is a video cassette recorder (VCR), wherein the toggle setting is an ON/OFF setting of the VCR, the method further comprising:

determining, by the controller circuit, a TV/VIDEO setting of the VCR;

ascertaining, by the controller circuit, whether the TV/VIDEO setting of the VCR needs to be toggled for the video system to perform the function; and transmitting a TV/VIDEO toggle instruction from the controller circuit to the VCR if the TV/VIDEO setting of the VCR needs to be toggled for the video system to perform the function.

14. The method of claim 13, further comprising:

determining, by the controller circuit, an ON/OFF setting of a cable box;

ascertaining, by the controller circuit, whether the ON/OFF setting of the cable box needs to be toggled for the video system to perform the function; and transmitting an ON/OFF toggle instruction from the controller circuit to the cable box if the ON/OFF setting of the cable box needs to be toggled for the video system to perform the function.

15. The method of claim 12, further comprising performing the function.

16. The method of claim 15, wherein performing the function comprises displaying video data.

17. The method of claim 15, wherein performing the function comprises recording video data.

18. The computer-readable medium of claim 12, wherein determining, by the controller circuit, a status of a toggle setting of a video recorder of a video system comprises:

monitoring a video signal provided by the video recorder; and determining if the video signal has a predetermined characteristic.

19. The computer-readable medium of claim 12, wherein determining, by the controller circuit, a status of a toggle setting of a video recorder of a video system comprises:

toggling a setting of the video recorder;

monitoring a video signal provided by the video recorder before toggling;

determining if the video signal provided by the video recorder before toggling has a predetermined characteristic;

monitoring the video signal provided by the video recorder after toggling; and determining if the video signal provided by the video recorder after toggling has the predetermined characteristic.

20. The computer-readable medium of claim 12, wherein determining a status of a toggle setting of a video recorder of a video system comprises:

noting a sync position of a signal in a controller;

sequentially tuning to a plurality of good channels; and determining if the sync position changed while sequentially tuning to the plurality of good channels.

21. The computer-readable medium of claim 20, wherein sequentially tuning to a plurality of good channels comprises:

sequentially tuning to three known good channels.

22. The computer-readable medium of claim 20, wherein sequentially tuning to a plurality of good channels comprises:

sequentially tuning to a plurality of channels that are represented as non-solid screens.

* * * * *